United States Patent [19]

Guyot et al.

[11] 4,180,823
[45] Dec. 25, 1979

[54] CONTROL DEVICE FOR CONTROLLING THE MOVEMENTS OF TWO CARRIAGES OF A DUPLEX RECORDER

[75] Inventors: Pierre Guyot, Franconville; Alain Coty, Sagy; Paul Delfau, Les Puits la Marliere-Villiers le Bel, all of France

[73] Assignee: Societe Commerciale Chauvin Arnoux Societe Anonyme Francaise, Paris, France

[21] Appl. No.: 964,748

[22] Filed: Nov. 29, 1978

[30] Foreign Application Priority Data

Dec. 2, 1977 [FR] France ................................. 77 36258

[51] Int. Cl.² ............................................ G03D 15/16
[52] U.S. Cl. .................................. 346/139 B; 346/66; 33/23 B
[58] Field of Search ................. 346/139 R, 139 B, 66; 33/23 B, 23 C

[56] References Cited

U.S. PATENT DOCUMENTS

| 2,319,932 | 5/1943 | Jacobs | 346/139 R |
| 3,360,799 | 12/1967 | Polster | 346/139 R |

Primary Examiner—Monroe H. Hayes

[57] ABSTRACT

A control device for controlling the movements of first and second recording means support-carriages of a two-carriage duplex recorder, comprising a flexible elongated traction means connected to said first carriage, and drive means associated with said traction means for moving said first carriage selectively in two opposite directions, wherein coaxial first and second wheels are mounted for rotation as a unit on said second carriage about an axis at right angles to said two opposite directions, said first wheel being in driving relationship with said traction means so as to be rotatively driven thereby, and an elongated fixed reaction member extending in a parallel direction to said two opposite directions and being in engagement with said second wheel to cause the latter and said second carriage to move along said reaction member upon rotation of said first and second wheels.

6 Claims, 3 Drawing Figures

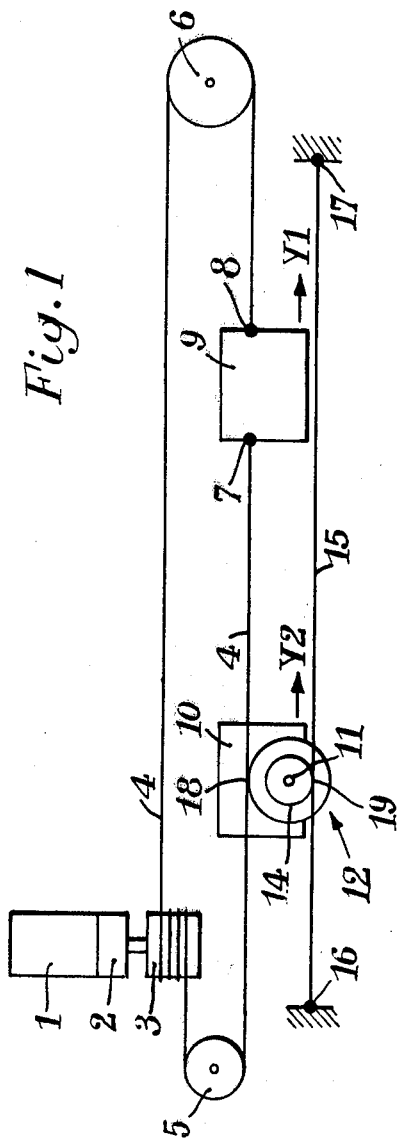
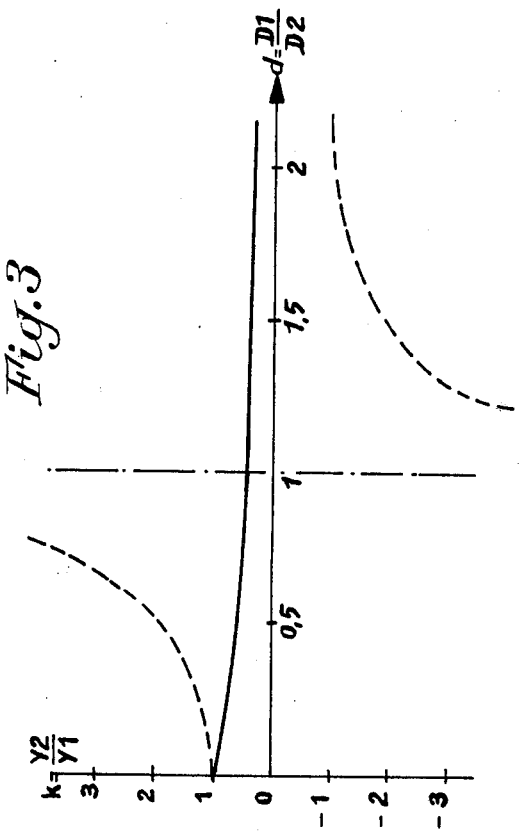
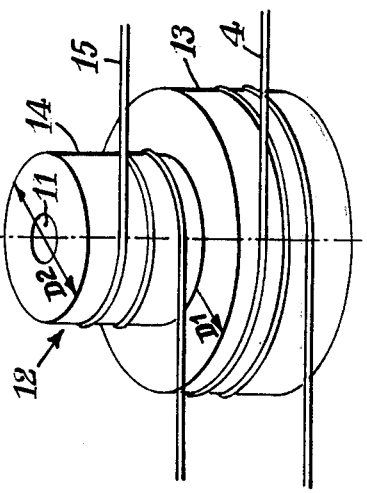

CONTROL DEVICE FOR CONTROLLING THE MOVEMENTS OF TWO CARRIAGES OF A DUPLEX RECORDER

BACKGROUND OF THE INVENTION

1. Field of the Invention

The present invention relates to a control device for controlling the movements of first and second recording means support-carriages of a two-carriage duplex recorder, of the type comprising a flexible elongated traction means connected to said first carriage, and drive means associated with said traction means for moving said first carriage selectively in two opposite directions.

A duplex recorder is a two-channel servo-controlled recorder in which the movements of the two carriages are controlled by the same phenomenon. With respect to a conventional two-channel recorder, a duplex recorder allows the amplifying means, the motor and the servo-control of one channel to be economized or dispensed with. Such a duplex recorder is used for example to record the same phenomenon on different scales. Some parts of the large scale recording may for example be used for taking readings or for making calculations, whereas the reduced scale recording may be kept for filing purposes.

2. Description of the Prior Art

The movement of the carriage associated to one channel of a servo-controlled recorder is usually provided by a motor driving a capstan through a reduction gear, the capstan being in driving engagement with a traction cable connected to said carriage. In the case of a duplex recorder, the movement of the carriage associated to the second channel may be provided by a second traction cable driven by a second capstan which is itself driven by the same motor as the first capstan, but having a different diameter from that of the first capstan.

Such an arrangement requires the setting up of said second capstan as well as other guide pulleys for the second cable, which renders it impossible to use the structure of a recording module of a conventional recorder. Since the demand for duplex recorders is relatively small in relation to other types of recorders, it results in high constructions costs.

SUMMARY OF THE INVENTION

Therefore, the main object of the present invention is to provide a control device including very simple means for controlling the movement of the second carriage of a duplex recorder, which can be easily incorporated in the structure of a recording module of a conventional recorder used for making said duplex recorder.

To this end, the invention provides a control device of the type referred to above, wherein coaxial first and second wheels are mounted for rotation as a unit on said second carriage about an axis at right angles to said two opposite directions, said first wheel being in driving relationship with said traction means so as to be rotatively driven thereby, and an elongated fixed reaction member extending in a parallel direction to said two opposite directions and being in engagement with said second wheel to cause the latter and said second carriage to move along said reaction member upon rotation of said first and second wheels.

In a preferred embodiment of the invention, said traction means and said reaction member comprise first and second cables, respectively, and said first and second wheels comprise a differential pulley having first and second cylindrical portions of different diameters forming said first and second wheels, respectively, said first cable having a portion wound at least one turn around the periphery the first cylindrical portion of said differential pulley, and said second cable having two fixed end portions and an intermediate portion wound at least one turn around the periphery of the second cylindrical portion of said differential pulley. The points where said first and second cables leave respectively the first and second cylindrical portions of said differential pulley are situated on opposite sides, respectively, of the axis of rotation of the differential pulley, so that the scale of a recording made by a recording means supported by the second carriage is smaller than that of a recording made by another recording means supported by the first carriage and so that the movements of said first and second carriages take place in the same direction.

Other features and advantages of the invention will appear in the description which follows, given by way of non-limiting example, with reference to the enclosed drawing in which:

BRIEF DESCRIPTION OF THE DRAWING

FIG. 1 is a general view of the control device of the invention;

FIG. 2 is a perspective view showing a differential pulley;

FIG. 3 is a diagram showing how the reduction ratio varies as a function of the ratio of the radii of the drums of the differential pulley.

DESCRIPTION OF THE PREFERRED EMBODIMENT

In FIG. 1, there is shown at 1 a motor which is preferably a DC motor, and at 2 a reduction gear driving a capstan 3. A control or traction cable 4 is wound a few turns around capstan 3 so as to be driven thereby upon energization of motor 1. One run of cable 4 passes over a fixed-axis guide pulley 5 and the opposite run of cable 4 passes over another guide pulley 6. The end portions 7 and 8 of cable 4 are fixed to opposite sides, respectively, of a first carriage 9. Of course, if an endless cable or belt is used for cable 4, it is sufficient to connect one point of the endless cable or belt to carriage 9. The carriage 9 carries a recording member not shown, such as a pen. It also carries a potentiometer slider (not shown) which serves to provide the position control with respect to an input information. The carriage 9 is also guided in a known manner by rails not shown.

A second carriage 10, also provided with a recording member (not shown), is guided by said rails or by other rails so as to be movable along the same path as the first carriage 9 or along a parallel path situated at a small distance from the path of the first carriage 9. The second carriage 10 comprises an axis 11 which extends at right angles to the paths of carriages 9 and 10, and on which may freely rotate a differential pulley 12. The differential pulley 12 comprises a first drum 13, and one of the runs of control cable 4, for instance between guide pulley 5 and first carriage 9, is wound at least one turn around drum 13 so as to cause pulley 12 to rotate about axis 11 upon energization of motor 1. The differential pulley 12 comprises also a second drum 14, integral with the first drum 13. A second cable 15 having two fixed ends 16 and 17 is wound at least one turn around drum 14. Cable 15 acts as a reaction member for the differential pulley 12, thereby causing said differential pulley to "roll" and second carriage 10 to move along cable 15 upon energization of motor 1.

In figure 1, it can be seen that the points 18, 19 where cables 4 and 15 leave respectively the first drum 13 and the second drum 14 are situated on opposite sides of the axis of rotation 11 of the differential pulley 12.

But, it is also possible to wind cables 4 and 15 around drum 13 and 14 so that points 18 and 19 are located on the same side of axis 11, as can be seen in FIG. 2. In this perspective view, it can also be seen that drums 13 and 14 have a cylindrical shape and are coaxial with axis 11. Drum 13 has a diameter D1 greater than the diameter D2 of drum 14, but it is possible to vary these diameters.

If d is the ratio of the diameters, $d = (D1/D2)$.

The operation of the control device for carriage 9 and 10 is the following:

For an angle of rotation a of the differential pulley 12, the ordinate $Y_2$ of the second carriage 10 will vary by $y2 = a \cdot D2/2$.

If points 18 and 19 are situated on opposite sides of the axis 11 of pulley 12, the ordinate $Y_1$ of the first carriage 9 will vary by:

$$y1 = \frac{a \cdot D1}{2} + \frac{a \cdot D2}{2}$$

So we have:

$$\frac{y2}{y1} = \frac{D2}{D1 + D2} = \frac{1}{1 + d}$$

If $k = y2/y1$, the ratio of the movements $k = 1/1+d$

So, we have movements in the same direction, with a reduction of the movement of the second carriage 10, whatever the value of the ratio of the diameters of the drums 13 and 14. In particular, for identical diameters, the reduction is $\frac{1}{2}$. It is often preferred to have a smaller reduction than $\frac{1}{2}$, by having $D1 > D2$, i.e. $d > 1$.

The two carriages 9 and 10 may have merging paths, since they are never called on to meet if their starting point are suitably set at the beginning.

If points 18 and 19 are located on the same side of axis 11 of pulley 12, as in the case of FIG. 2, we have:

$$y1 = \frac{a \cdot D2}{2} - \frac{a \cdot D1}{2} \; ; \; \frac{y2}{y1} = \frac{D2}{D2 - D1} \; ; \; k = \frac{1}{1-d}$$

The system jams for $d = 1$.

If $d < 1$, the movements take place in the same direction with an increase of the movement of the second carriage 10 in relation to the first carriage 9, which is of none interest in the case considered where a second reduced scale recording is desired.

If $d > 1$, the movements take place in opposite directions (k negative).

If $1 < d < 2$, there is also an increase of the movement of the second carriage 10, of no interest here. But if a $d > 2$, we have again a reduction of the movement of the second carriage 10. In this case however, the carriages 9 and 10 will meet and pass if carriage 9 can move over the whole width of the recording medium, and the paths of the carriages must not interfere so as to allow them to meet and pass each other, as in the case of two independent channel recorder.

The values of k as a function of d are given in the diagram of FIG. 3, in which the curve shown by a continuous line is relative to the case where points 18 and 19 are situated on opposite sides of axis 11, and in which the curves shown by dashed lines are relative to the case where points 18 and 19 are situated on the same side of axis 11.

If a slight slipping occurred between capstan 3 and cable 4, that would have no effect on the plot of the recorder because of the position control. On the other hand, if a slipping occurred on the drums 13 and 14 of the differential pulley 12, there would result therefrom a loss of synchronism between the two recordings. The avoid this defect, serrated belts and serrated pulleys can be used.

It is however simpler to provide each winding of cable 4 and 15 on drums 13 and 14 with a sufficiently large number of turns so that each cable may be anchored at a point of its winding on the surface of the drum on which it is wound. In this case, if y1 max designates the maximal displacement of the first carriage 9, the number of turns of cable 4 around drum 13 must be at least equal to $y1 \max/\pi D1$. Similarly, if y2 max is the maximal displacement of the second carriage 10, the number of turns of cable 15 around drum 14 must be at least equal to $y2 \max/\pi D2$.

It is possible to provide a respective area of the recording medium for each recording track, so as to be able to separate later the two different scale recordings.

In the case where the movements take place in the same direction, it is also possible to provide a common zero point for the ordinates $Y_1$ and $Y_2$ of the two recordings.

Of course, the description given above is in no wise limiting and, the insertion of the second carriage 10 between capstan 3 and guide pulley 6, or the control of more than two carriages may be contemplated. Also, the motor 1 and reduction gear 2 may drive directly one of the two pulleys 5 and 6, the driven pulley thus acting as the capstan 3. Also, serrated belts or sprocket chains can be used instead of cables 4 and 15, and serrated pulleys or sprocket wheels can be used instead of pulleys 5 and 6 and drums 13 and 14. In this case, it is not necessary that the serrated belts or the sprocket chains are wound at least one turn around the serrated pulleys or the sprocket wheels substituted for the drums 13 and 14. Furthermore, a fixed toothed rack can be used as a reaction member instead of cable 15, and a pinion instead of drum 14.

What is claimed is:

1. A control device for controlling the movements of first and second recording means support-carriages of a two-carriage duplex recorder, comprising a flexible elongated traction means connected to said first carriage, and drive means associated with said traction means for moving said first carriage selectively in two opposite directions, wherein coaxial first and second wheels are mounted for rotation as a unit on said second carriage about an axis at right angles to said two opposite directions, said first wheel being in driving relationship with said traction means so as to be rotatively driven thereby, and an elongated fixed reaction member extending in a parallel direction to said two opposite directions and being in engagement with said second wheel to cause the latter and said second carriage to move along said reaction member upon rotation of said first and second wheels.

2. A control device according to claim 1, wherein said traction means and said reaction member comprise first and second cables, respectively, and said first and second wheels comprise a differential pulley having first and second cylindrical portions of different diameters forming said first and second wheels, respectively, said first cable having a portion wound at least one turn around the periphery of the first cylindrical portion of said differential pulley, and said second cable having two fixed end portions and an intermediate portion wound at least one turn around the periphery of the second cylindral portion of said differential pulley.

3. A control device according to claim 2, wherein the points where said first and second cables leave respectively the first and second cylindrical portions of said differential pulley are situated on opposite sides, respectively, of the axis of rotation of the differential pulley, so that the scale of a recording made by a recording means supported by the second carriage is smaller than that of a recording made by another recording means supported by the first carriage and so that the movements of said first and second carriages take place in the same direction.

4. A control device according to claim 3, wherein the diameter of the first cylindrical portion of the differential pulley is greater than that of the second cylindrical portion of said differential pulley so that the scale reduction ratio of the recordings is smaller than ½.

5. A control device according to claim 2, wherein the points where said first and second cables leave respectively the first and second cylindrical portions of said differential pulley are situated on the same side of the axis of rotation of the differential pulley, and the diameter of said first cylindrical portion is greater than twice that of said second cylindrical portion, so that the scale of a recording made by a recording means supported by the second carriage is smaller than that of a recording made by another recording means supported by the first carriage.

6. A control device according to claim 2 wherein said first cable is wound around said first cylindrical portion a number of turns which is at least equal to $y1\ max/\pi D_1$, where $y1\ max$ is the maximal displacement for the first carriage and $D_1$ is the diameter of said first cylindrical portion, said second cable is wound around said second cylindrical portion a number of turns which is at least equal to $y2\ max/\pi D_2$, where $y2\ max$ is the maximal displacement for the second carriage and $D_2$ the diameter of said second cylindrical portion, and each of said first and second cables has one point of the winding thereof anchored to the periphery of a respective one of said first and second cylindrical portions.

* * * * *